(12) United States Patent
Saku et al.

(10) Patent No.: US 6,945,497 B2
(45) Date of Patent: Sep. 20, 2005

(54) COCKPIT DOOR OF AIRCRAFT

(75) Inventors: Fumiaki Saku, Tokyo (JP); Tadashi Watanabe, Tokyo (JP); Yasuo Sekikawa, Tokyo (JP)

(73) Assignee: Jamco Corporation, Tokyo (JP)

( * ) Notice: Subject to any disclaimer, the term of this patent is extended or adjusted under 35 U.S.C. 154(b) by 0 days.

(21) Appl. No.: 10/759,252

(22) Filed: Jan. 20, 2004

(65) Prior Publication Data

US 2005/0082433 A1 Apr. 21, 2005

(30) Foreign Application Priority Data

Oct. 2, 2003 (JP) ........................................ 2003-344200

(51) Int. Cl.$^7$ ................................................. B64C 1/14
(52) U.S. Cl. ................... 244/129.5; 244/118.5
(58) Field of Search ........................... 244/118.5, 129.4, 244/129.5, 129.1

(56) References Cited

U.S. PATENT DOCUMENTS 6,474,599 B1  11/2002  Stomski
6,698,690 B2 *  3/2004  Novak et al. ............... 244/121
2003/0066930 A1 *  4/2003  Pratt et al. ............... 244/118.5

FOREIGN PATENT DOCUMENTS

JP  2003-261098  9/2003

* cited by examiner

*Primary Examiner*—Peter M. Poon
*Assistant Examiner*—T D. Collins
(74) *Attorney, Agent, or Firm*—Westerman, Hattori, Daniels & Adrian, LLP

(57) ABSTRACT

A cockpit door body 10 can be opened toward a cockpit in a direction shown by arrow $R_1$ by a crew inside a cockpit 3 by manipulating a knob on a first hinge device 40. When rapid decompression occurs in the cockpit, a mechanical pressure-sensitive device of the first hinge device 40 operates to release a bolt from a catch. By the difference in pressure between the cabin and the cockpit, the door body 10 opens in the direction of arrow $R_1$ to thereby reduce pressure difference. When rapid decompression occurs in cabin 4, a second latch device 60 detects this pressure difference and operates mechanically to rotate a link lever 62 to release a stopper 64 from a catch 66. Flaps 30 and 32 are opened toward cabin 4 in the direction of arrow $R_2$ by the difference in pressure between the cockpit and cabin to thereby reduce pressure difference.

2 Claims, 18 Drawing Sheets

COCKPIT DOOR OF AIRCRAFT

FIELD OF THE INVENTION

The present invention relates to a cockpit door of an aircraft that is disposed between a cockpit and a passenger cabin of the aircraft.

DESCRIPTION OF THE RELATED ART

Currently, there exists a growing demand for improving the strength of the cockpit door of aircrafts to counter the recent terrorist attacks attempted on aircrafts, and various countermeasures are being proposed.

For example, patent document 1 discloses a system for increasing the security of an aircraft by providing an isolated chamber between the cockpit and the passenger cabin.
Patent Document 1: U.S. Pat. No. 6,474,599
Patent Document 2: Japanese Patent Application No. 2002-62885

According to the system disclosed in the above-mentioned publication, there is a need to secure a space for building a chamber between the cockpit and the passenger cabin, by which the effective space of the cabin is reduced.

SUMMARY OF THE INVENTION

Therefore, the present invention provides a cockpit door having an overall strength of the cockpit door increased so as to enhance the security of the aircraft, and also having a means for communicating the cockpit with the cabin in case of decompression of the cabin during which the pressure within the cabin is reduced rapidly, and providing a means for the pilots and other crew members to escape.

In order to solve the problem, the cockpit door according to the present invention comprises, as basic means, a door body that opens toward the cockpit via a hinge disposed vertically, a latch disposed on one side end portion of the door body opposite to the hinge, two flaps disposed vertically on the door body that open toward the cabin via a hinge disposed vertically, a latch disposed on one side end portion of the flaps opposite from the hinge of the flap, and a pressure sensitive device for sensing the air pressure difference between the cabin and the cockpit and releasing the latch of the flaps.

The cockpit door according to the present invention enables to restrict access to the cockpit for safety, but releases flaps and the like automatically in case the pressure within the aircraft is reduced rapidly, securing an escape route for the crew in the cockpit.

DETAILED DESCRIPTION OF THE PREFERRED EMBODIMENT

Figure 1:
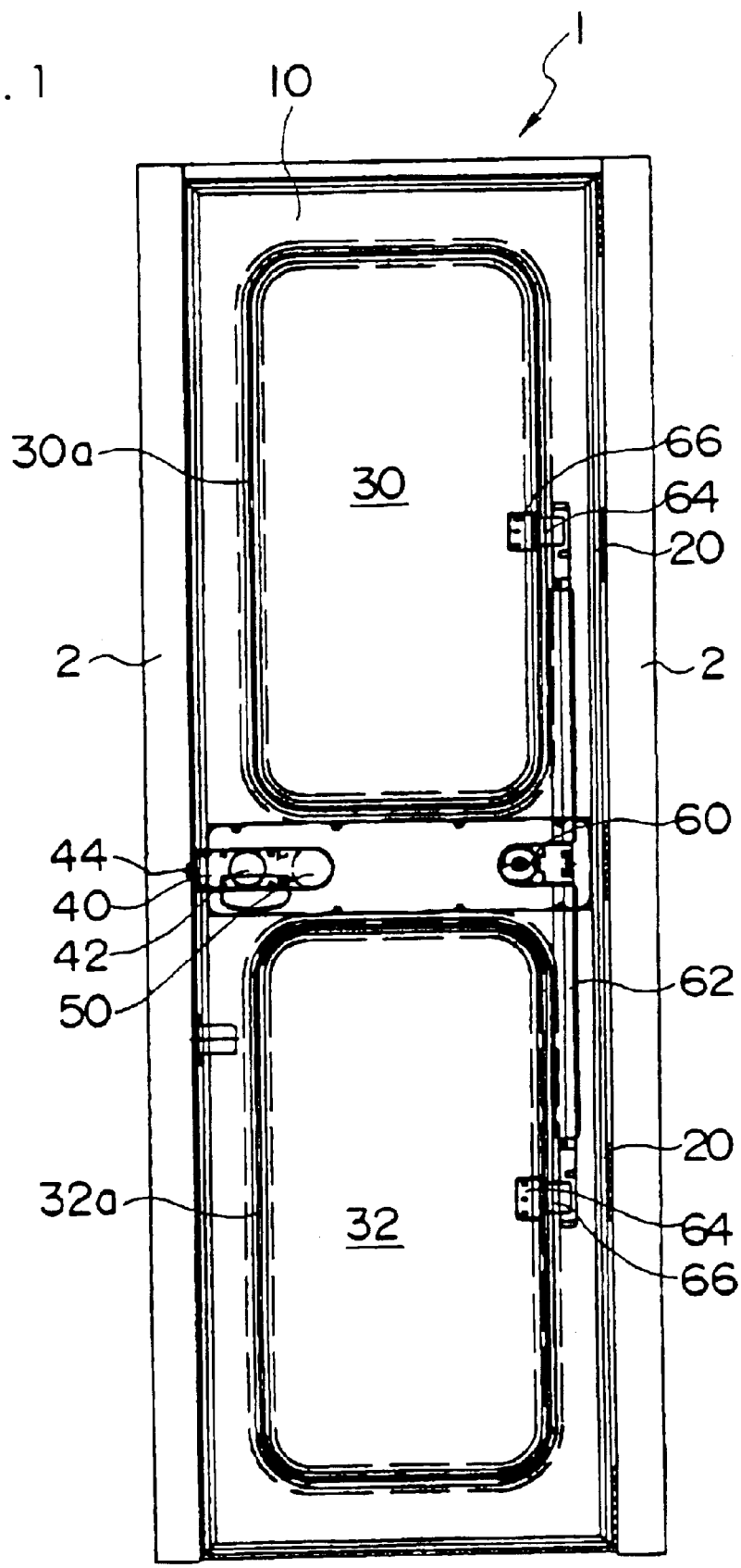
FIG. 1 is an explanatory view of the cockpit door according to the first embodiment of the present invention.
Figure 2:
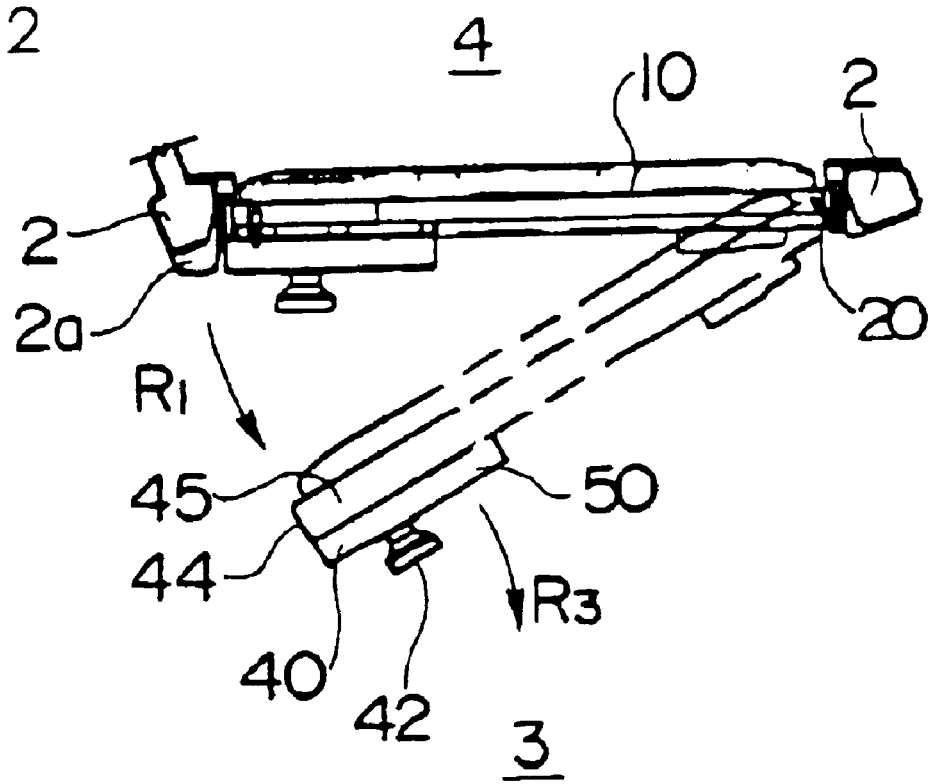
FIG. 2 is a cross-sectional view of FIG. 1.
Figure 3:
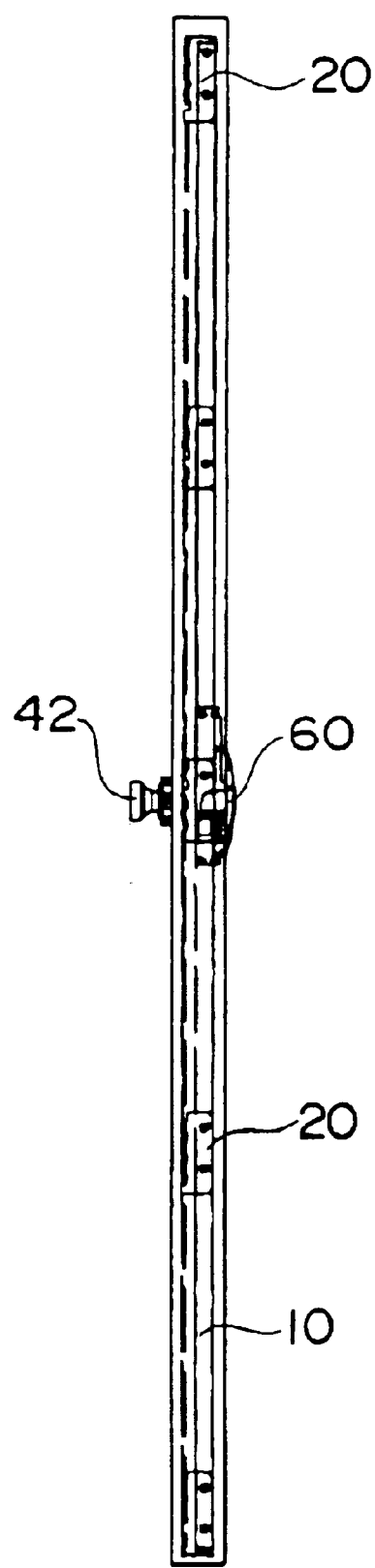
FIG. 3 is a side view of the cockpit door according to the first embodiment of the present invention.
Figure 4:
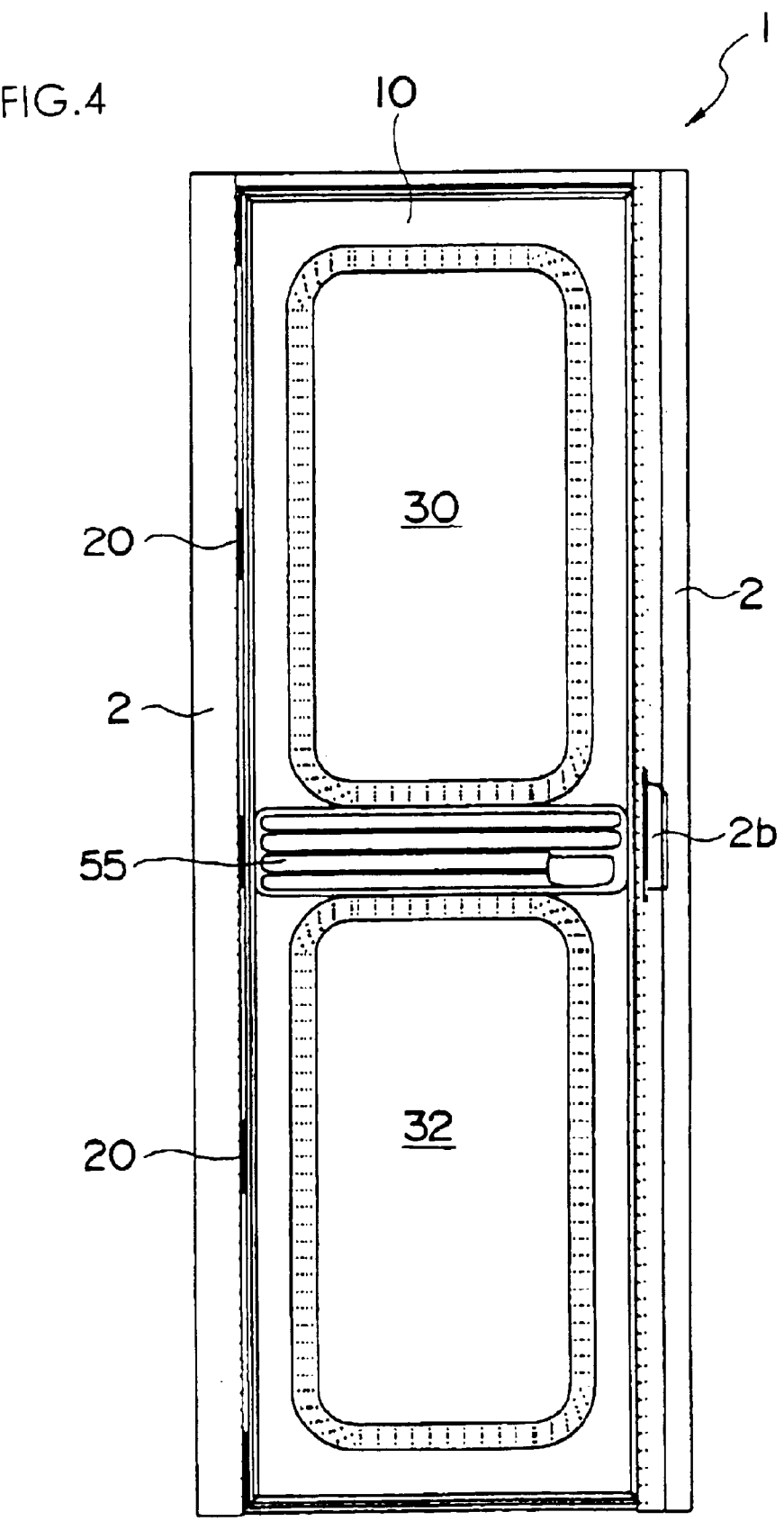
FIG. 4 is an explanatory view showing the cockpit door of the first embodiment from the cabin side.
Figure 5:
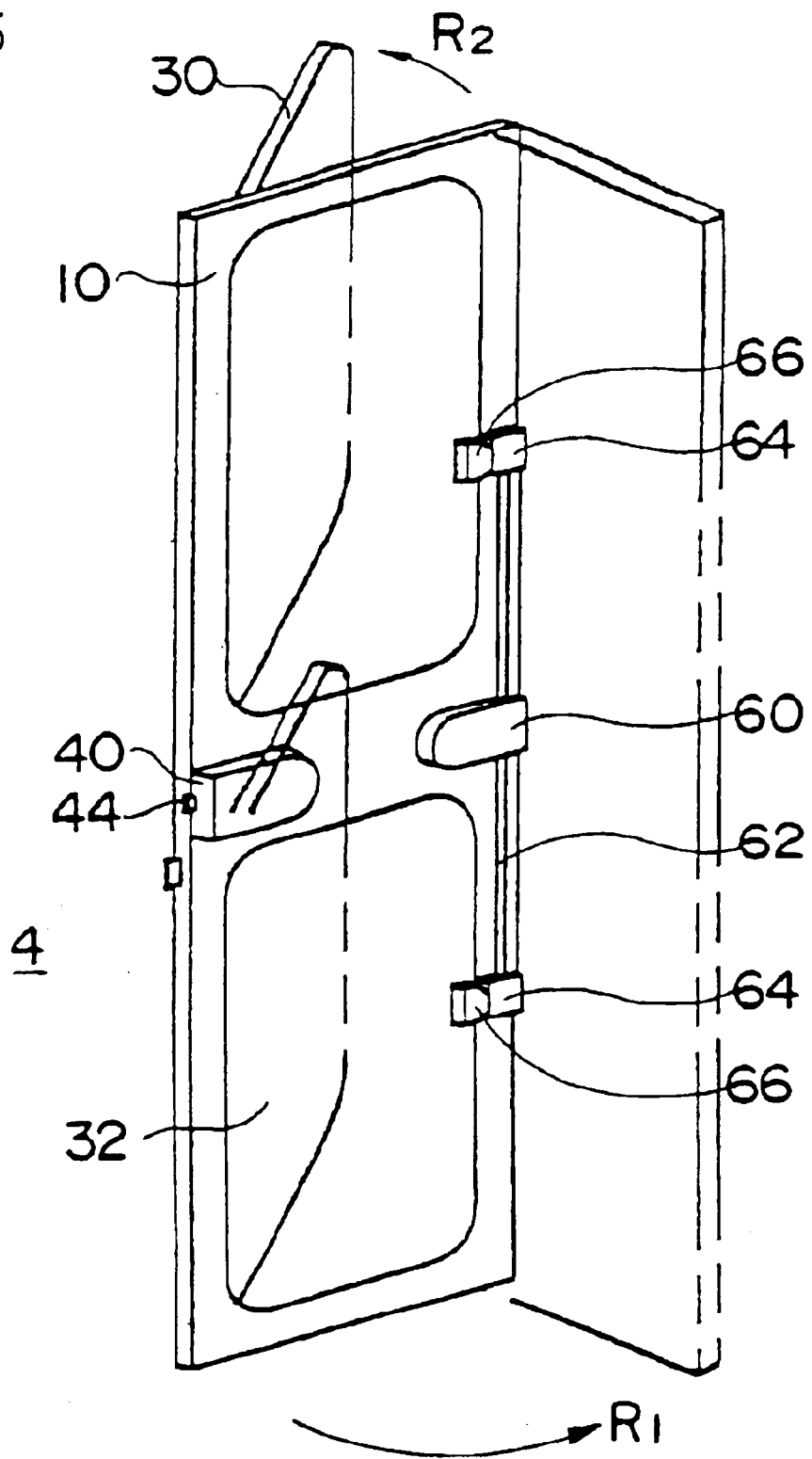
FIG. 5 is an explanatory view showing the operation of the cockpit door according to the first embodiment of the present invention.
Figure 6:
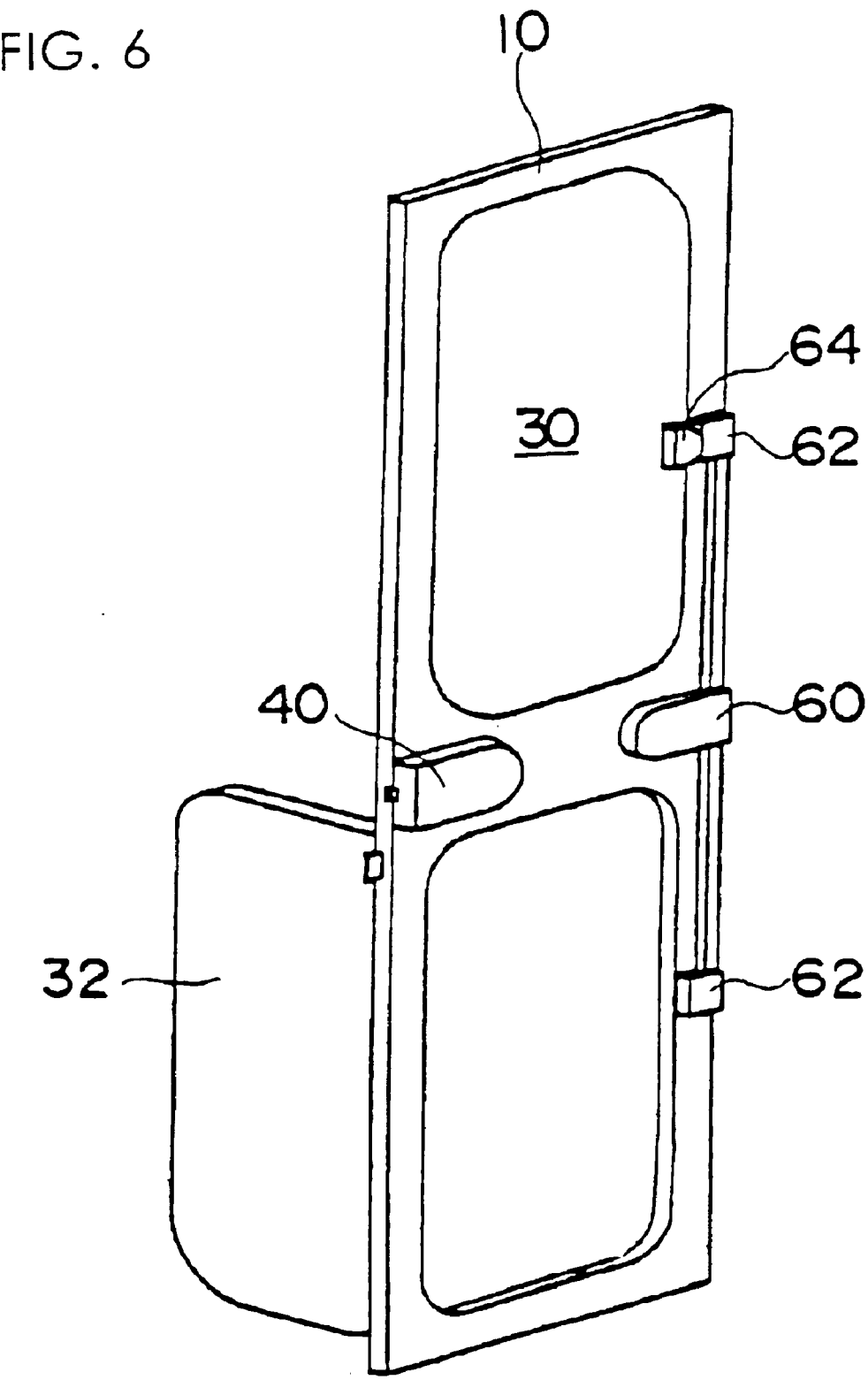
FIG. 6 is an explanatory view showing the operation of the cockpit door according to the first embodiment of the present invention.

FIGS. 1 through 6 illustrate a first embodiment of the present invention, wherein FIG. 1 is an explanatory view of a cockpit door seen from the cockpit side, FIG. 2 is a cross-sectional view of FIG. 1, FIG. 3 is a side view of the cockpit door, FIG. 4 is an explanatory view showing the cockpit door from the cabin side, and FIGS. 5 and 6 are explanatory views showing the operation of the cockpit door.

The cockpit door, the whole of which being designated by reference number 1, comprises a board-like door body 10, and the door body 10 is secured to a fixed structural member 2 via a hinge 20 so as to be able to open toward the cockpit.

The side portion of the door body 10 opposite to where the hinge is located is equipped with a first latch device 40 that functions as a main latch for the cockpit door.

The first latch device 40 comprises a knob 42 that can be operated only from the cockpit side, and a bolt 44 that is interlocked with the movement of the knob 42, wherein the bolt 44 is capable of being engaged with and released from a catch provided to the fixed structural member 2.

The cockpit door opens toward the cockpit 3 in the direction of arrow $R_1$.

The cockpit door according to the present embodiment comprises two openings, an upper opening and a lower opening, formed to the door body, with two flaps 30 and 32 disposed to cover the openings, respectively.

The first flap 30 is mounted on the door body 10 so as to be able to swing toward the cabin via a hinge not shown disposed on a side portion 30a which is the side having the first latch device 40. A catch 66 is disposed on the side of the first flap 30 opposite from where the hinge is disposed.

A second latch device 60 is equipped to the door body 10 at the side having the hinge 20. The second latch device 60 comprises a rod 62 that is rotated automatically when an occurrence of a rapid decompression in the cabin is detected, and a stopper member 64 disposed at both ends of the rod 62.

The catch 66 of the first flap 30 is normally engaged with the stopper member 64, and the first latch device 40 for opening and closing the door body 10 is equipped with a mechanism for releasing a housing 50 of the latch device 40 automatically when an occurrence of a rapid decompression in the cockpit is detected.

According to FIG. 2, when this release mechanism is activated, the housing 50 of the latch device is revolved in the direction shown by arrow $R_3$ centering about a pin 45. By this rotational movement of the housing 50, the bolt 44 is released from the catch 2a in a protruded state without turning the knob 42.

Thus, the cockpit door body 10 is opened toward the cockpit 3.

This release mechanism of the latch is disclosed in above-mentioned patent document 2 filed by the present applicant.

FIG. 4 is an explanatory view showing the cockpit door from the cabin side.

The portion corresponding to the first and second latch devices of the door body 10 on the cabin side can be covered with a cover 55, and the bolt portion of the first latch device that is operable from the cockpit side is covered with a reinforcement plate 2b, preventing access to the latch from the cabin side.

FIGS. 5 and 6 are explanatory views showing the opening/closing action of the cockpit door.

A crew manipulating the knob of the first latch device 40 from the cockpit 3 side can open the cockpit door body 10 toward the direction shown by arrow $R_1$ or toward the cockpit.

When rapid decrease in pressure occurs within the cockpit, the mechanical pressure sensitive device of the first latch device 40 operates and releases the bolt from the catch. By the difference in pressure between the cockpit and the cabin, the door body 10 opens in the arrow $R_1$ direction to reduce the difference in air pressure.

When rapid decrease in pressure occurs within the cabin 4, the second latch device 60 operates mechanically by sensing this pressure difference, and the link lever 62 rotates to remove the stopper 64 from the catch 66.

The flaps 30 and 32 open toward the cabin 4 or in the direction shown by arrow $R_2$ by the difference in pressure between the cockpit and the cabin.

FIG. 6 shows the operation to open the flap 32 toward the cabin from the cockpit 3 in an emergency.

Regarding flap 32, a crew in the cockpit 3 can manually operate the stopper 62 to release the engagement of the stopper from the catch.

Thus, even if the first latch device 40 malfunctions and the door body 10 cannot be opened, the flap 32 can be opened toward the cabin, and the crew can escape into the cabin through the opening.

Figure 7:
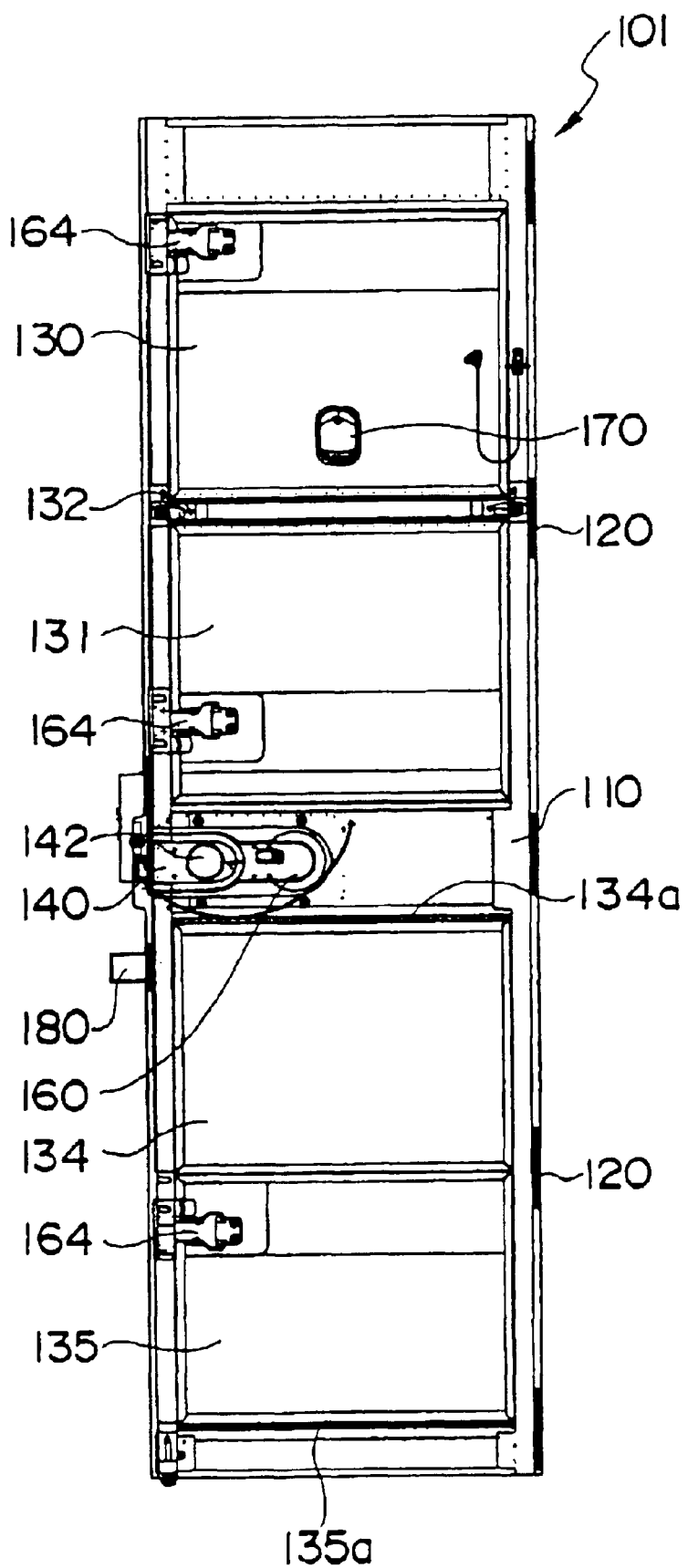
FIG. 7 is an explanatory view of the cockpit door according to the second embodiment of the present invention.
Figure 8:
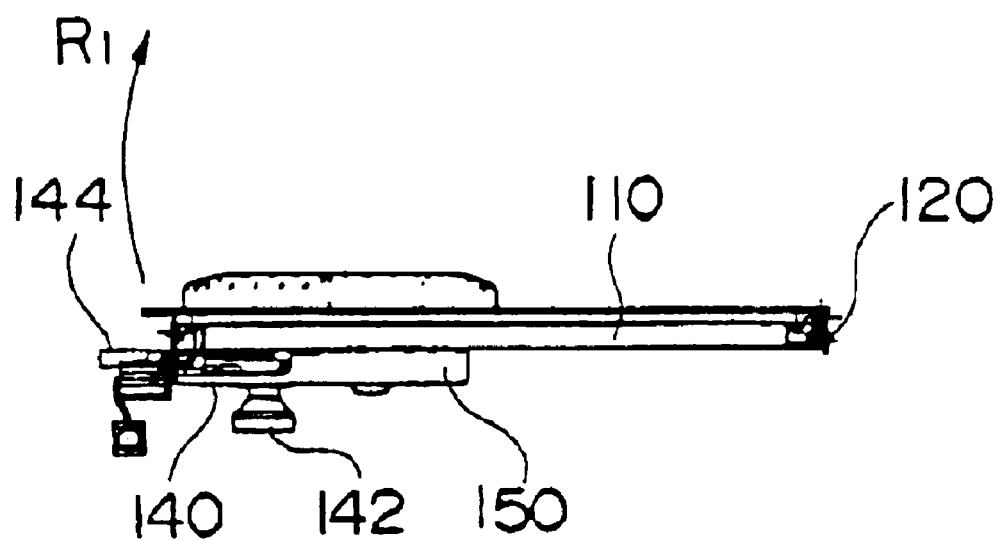
FIG. 8 is a cross-sectional view of FIG. 7.
Figure 9:
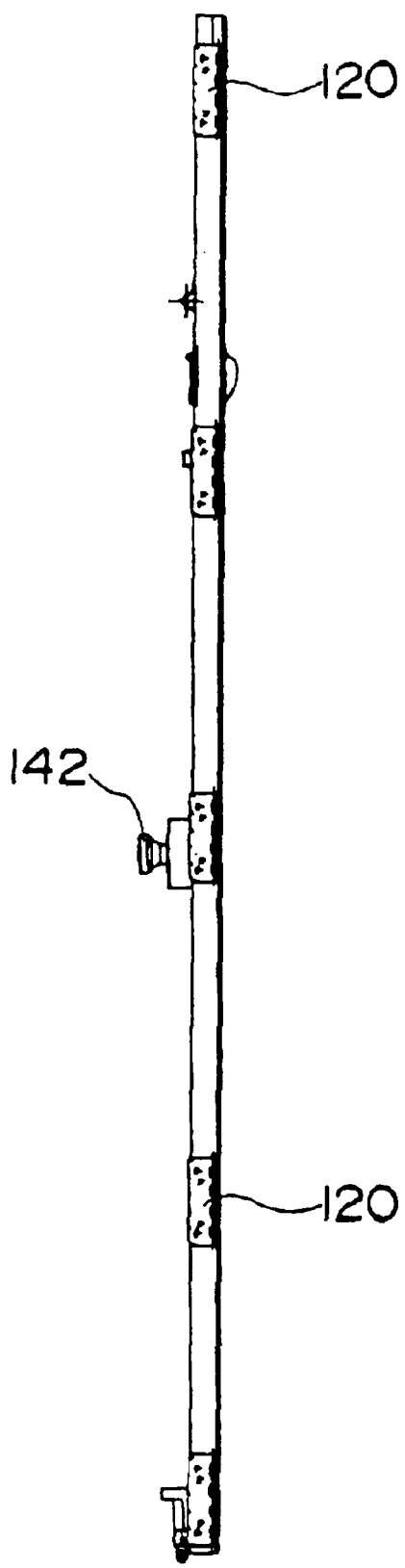
FIG. 9 is a side view of the cockpit door according to the second embodiment of the present invention.
Figure 10:
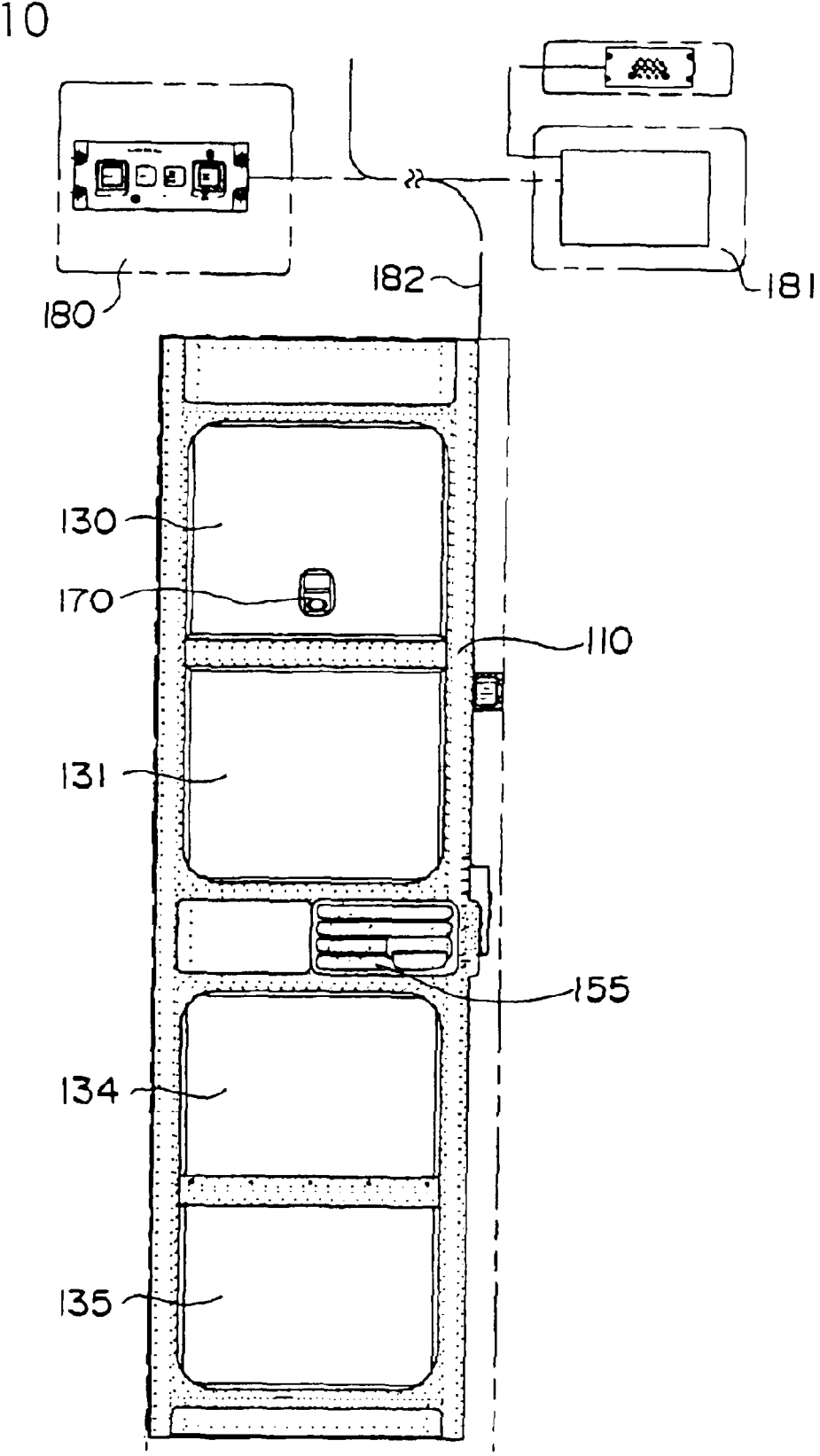
FIG. 10 is an explanatory view showing the cockpit door of the second embodiment from the cabin side.
Figure 11:
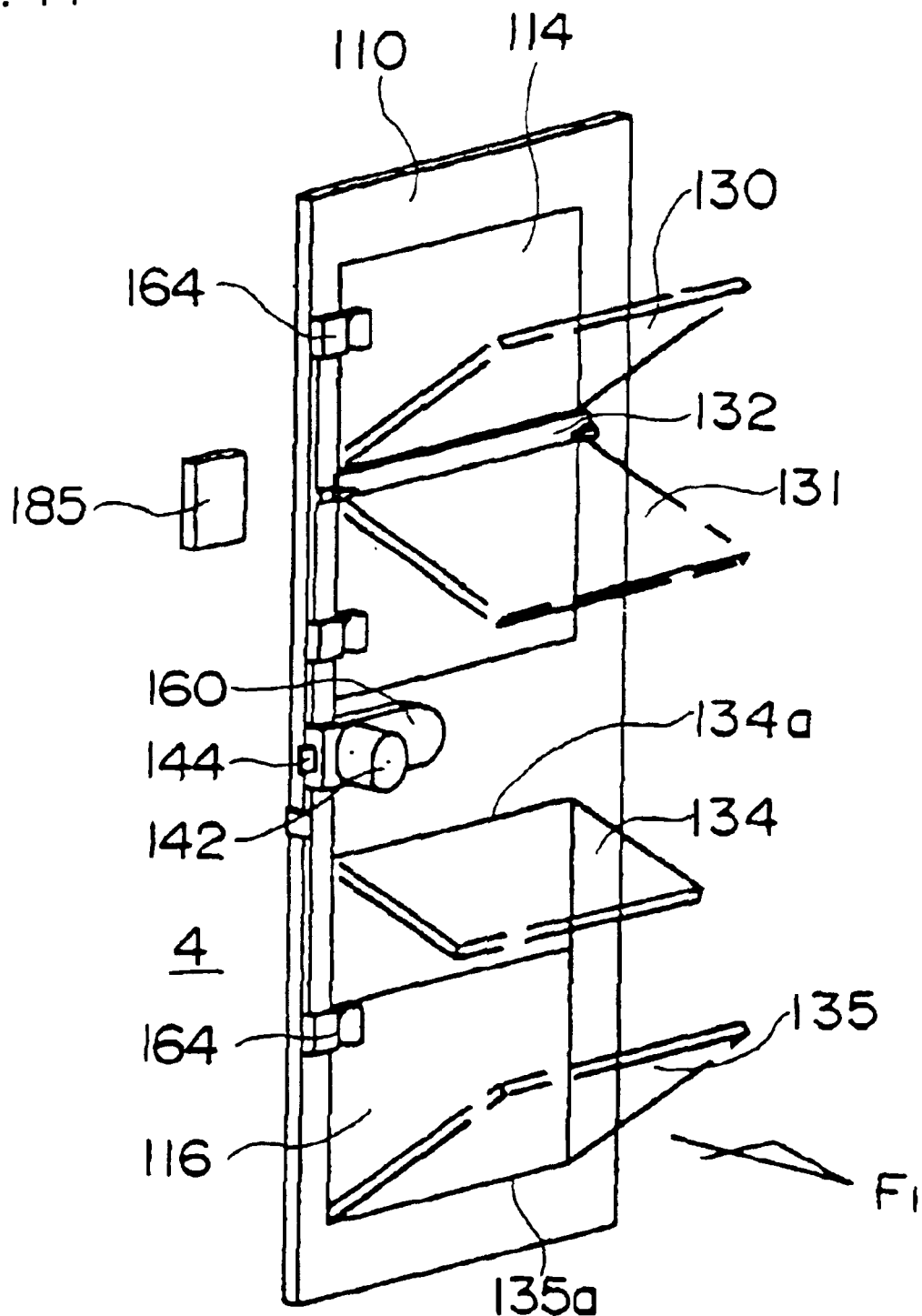
FIG. 11 is an explanatory view showing the operation of the cockpit door according to the second embodiment of the present invention.
Figure 12:
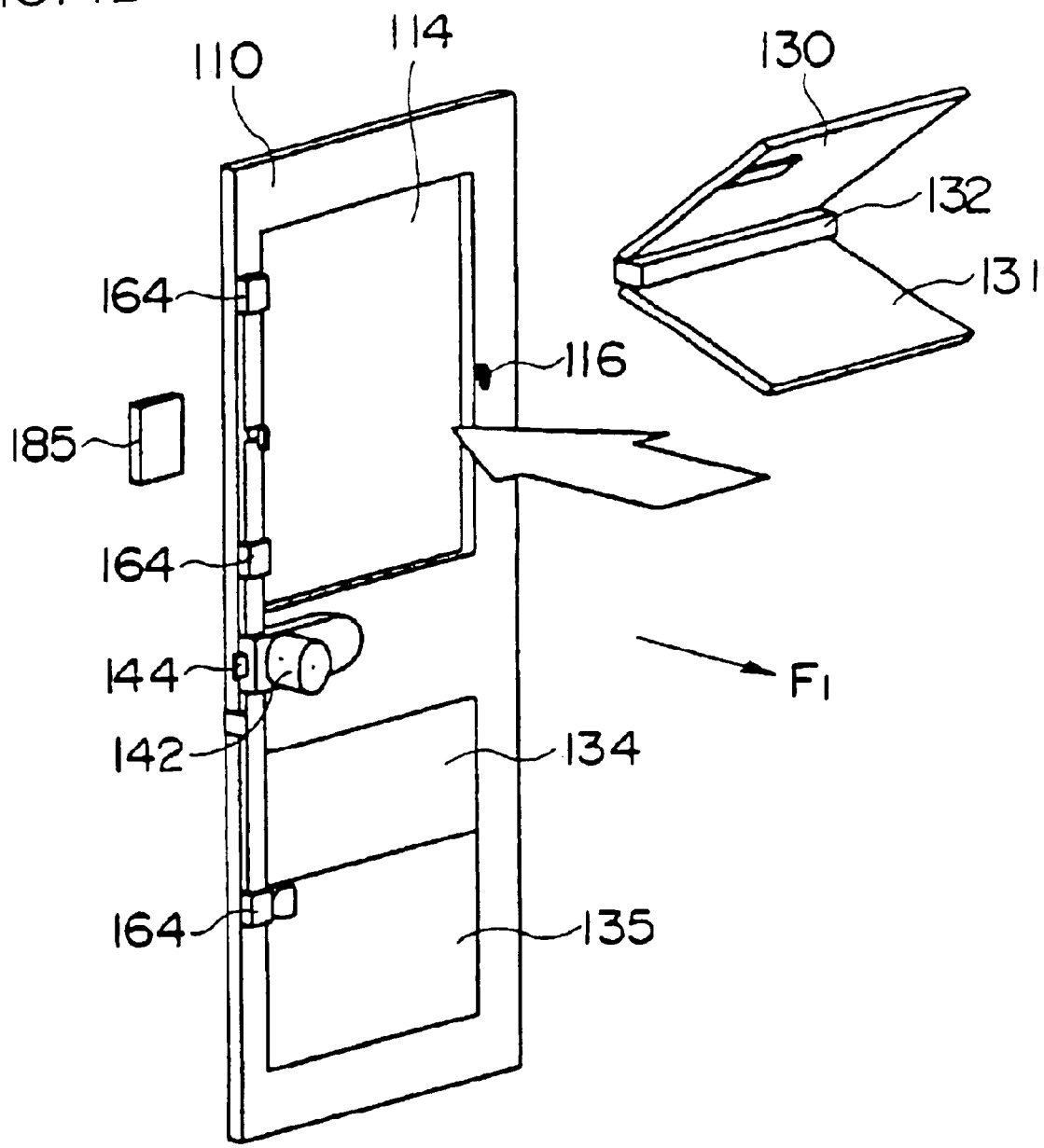
FIG. 12 is an explanatory view showing the operation of the cockpit door according to the second embodiment of the present invention.

FIGS. 7 through 12 illustrate a second embodiment of the present invention, wherein FIG. 7 is an explanatory view of the cockpit door seen from the cockpit side, FIG. 8 is a cross-sectional view of FIG. 7, FIG. 9 is a side view of the cockpit door, FIG. 10 is an explanatory view of the cockpit door seen from the cabin side, and FIGS. 11 and 12 are explanatory views showing the operation of the cockpit door.

The cockpit door, the whole of which being designated by reference number 101, comprises a board-like door body 110, and the door body 110 is secured to a fixed structural member via a hinge 120 so as to be able to open toward the cabin.

The side portion of the door body 110 opposite from where the hinge 120 is located is equipped with a first latch device 140 that functions as a main latch for the cockpit door.

The first latch device 140 comprises a knob 142 that can be operated only from the cockpit side and a bolt 144 that is interlocked with the movement of the knob 142, wherein the bolt 144 is capable of being engaged with or released from a catch provided to the fixed structural member.

The cockpit door opens toward the cabin 4 in the direction of arrow $R_1$.

The cockpit door according to the second embodiment comprises two openings, an upper opening and a lower opening, formed to the door body, with two flaps 130, 131 and 135, 136 disposed to cover each opening, respectively.

The flaps 130 and 131 constituting the first flap unit are supported via a hinge member 132 in a bendable manner.

The two flaps 130 and 131 are secured to the door body 110 via two stopper members 164, 164.

The first flap 130 is equipped with a door scope 170 enabling a crew to visually confirm the status of the cabin from the cockpit side.

The flaps 134 and 135 constituting the second flap unit are secured to the door body 110 via a hinge 134a and a hinge 135a, respectively.

The upper flap 134 opens by revolving around the upper rim of the flap via the hinge 134a, and the lower flap 135 opens by revolving around the lower rim of the flap via the hinge 135a.

The two flaps 134 and 135 are secured to the door body 110 via one stopper member 164.

The cockpit door is equipped with a latch device 160 for operating the piston and link when a change in pressure is detected mechanically, and the device is set to detect the change in air pressure between the cockpit and the cabin.

When rapid decompression occurs in the cockpit, the latch device 160 detects this change in pressure, and operates the stopper member 164 to release the flaps from the door body.

FIG. 10 shows the exterior of the cockpit door when seen from the cabin side, and the portion corresponding to the door handle, the pressure-sensitive latch device and the like disposed on the cockpit side of the door is covered with a cover 155. The present cockpit door is equipped with an electronic lock, and the command from control circuits 180 and 181 are transmitted via a line 182 to control the opening and closing of the electronic lock 186. The electronic lock 186 is manipulated via a switch 185 with a cover.

FIG. 11 shows the operation of the flaps when rapid decompression occurs in the cockpit 3 positioned in the direction of travel shown by arrow $F_1$.

The pressure-sensitive latch device 160 detects this decompression, and releases the three stopper members 164 via the link mechanism.

The two flaps 130 and 131 of the first flap unit are opened toward the cockpit 3 via the hinge 132, relieving the pressure difference between the cockpit 3 and cabin 4 through the opening 114.

The two flaps 134 and 135 of the second flap unit are each opened toward the cockpit 3 via hinges 134a and 135a, respectively, relieving the pressure difference between the cockpit 3 and cabin 4 through the opening 116.

FIG. 12 shows a mean for providing an emergency escape route when the door body 110 fails to open by some reason.

The two flaps 130 and 131 of the first flap unit can be bent inwardly via the hinge 132 by manipulating the stopper member 164 from the cockpit 3. The hinge 132 can be equipped with a spring or the like biasing it toward the bending direction.

In this state, the hinge 132 can be removed from the door body 110, and the crew inside the cockpit 3 can escape into the cabin through the opening 114.

Figure 13:
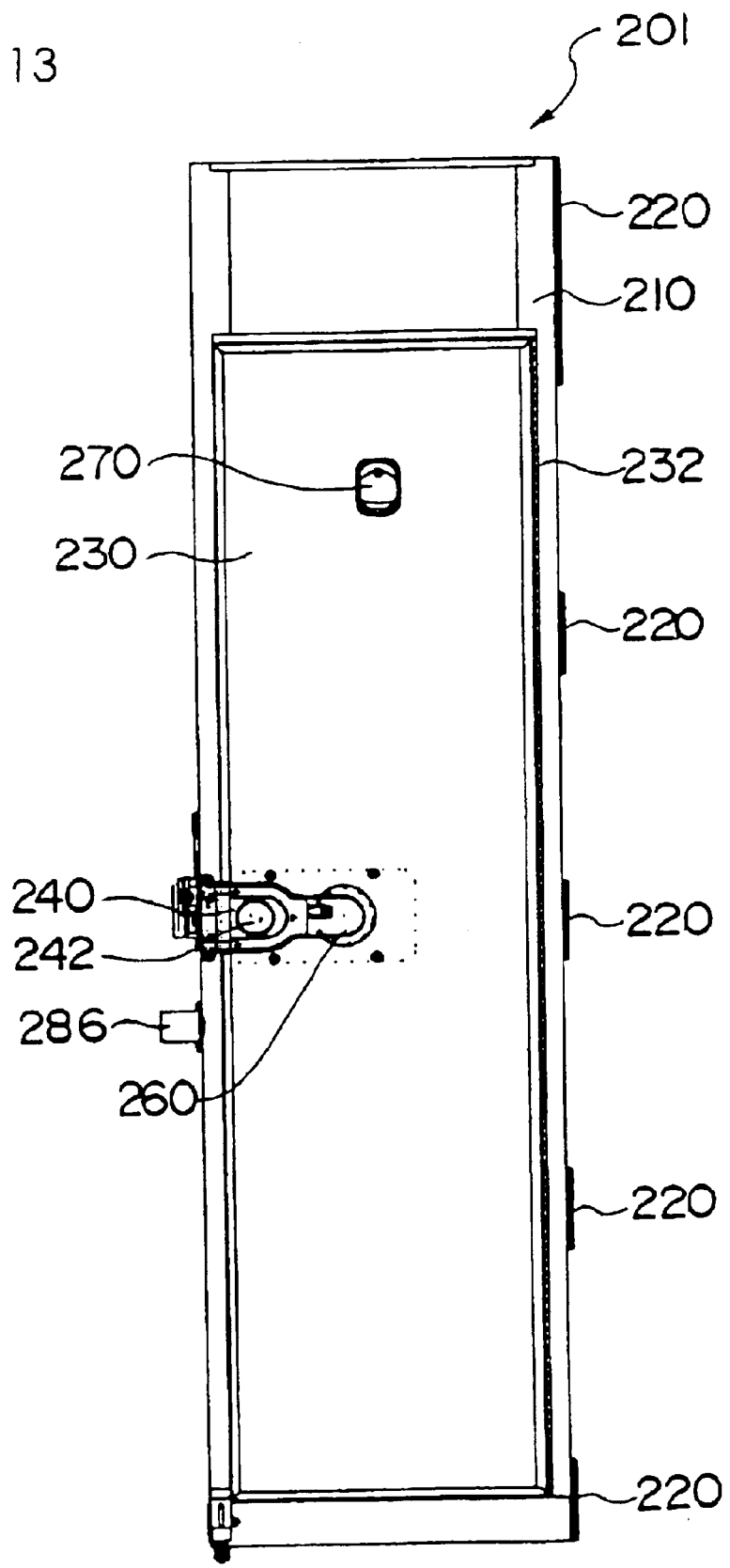
FIG. 13 is an explanatory view showing the operation of the cockpit door according to the third embodiment of the present invention.
Figure 14:
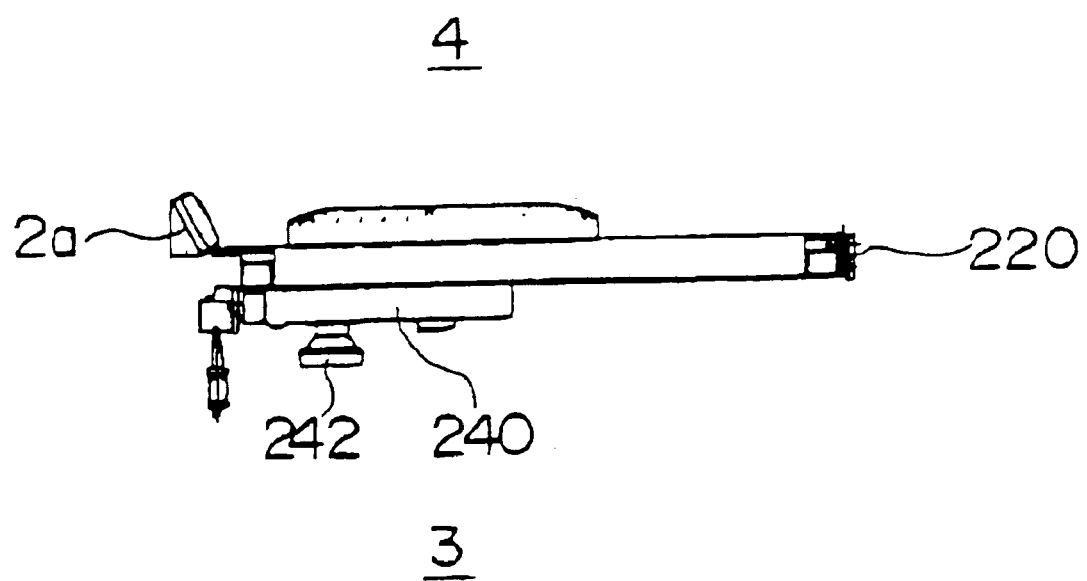
FIG. 14 is a cross-sectional view of FIG. 13.
Figure 15:
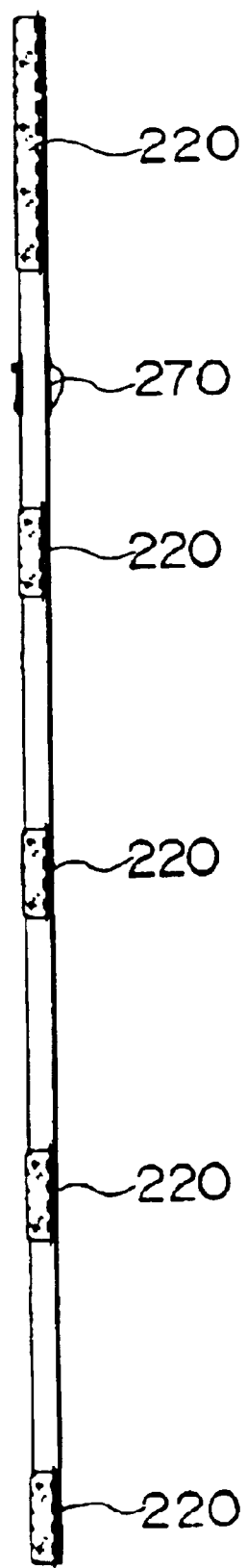
FIG. 15 is a side view of the cockpit door according to the third embodiment of the present invention.
Figure 16:
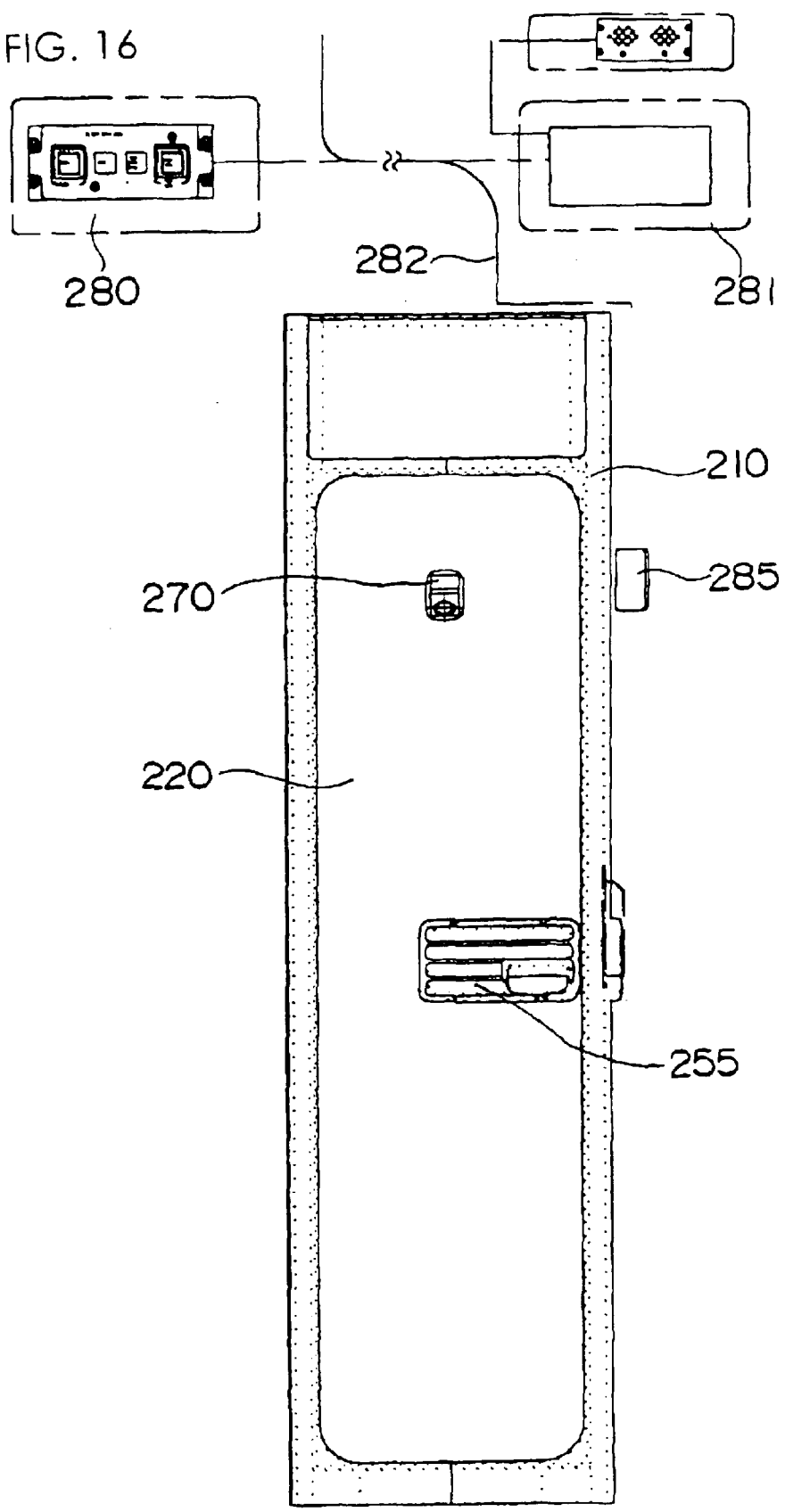
FIG. 16 is an explanatory view showing the cockpit door according to the third embodiment from the cabin side.
Figure 17:
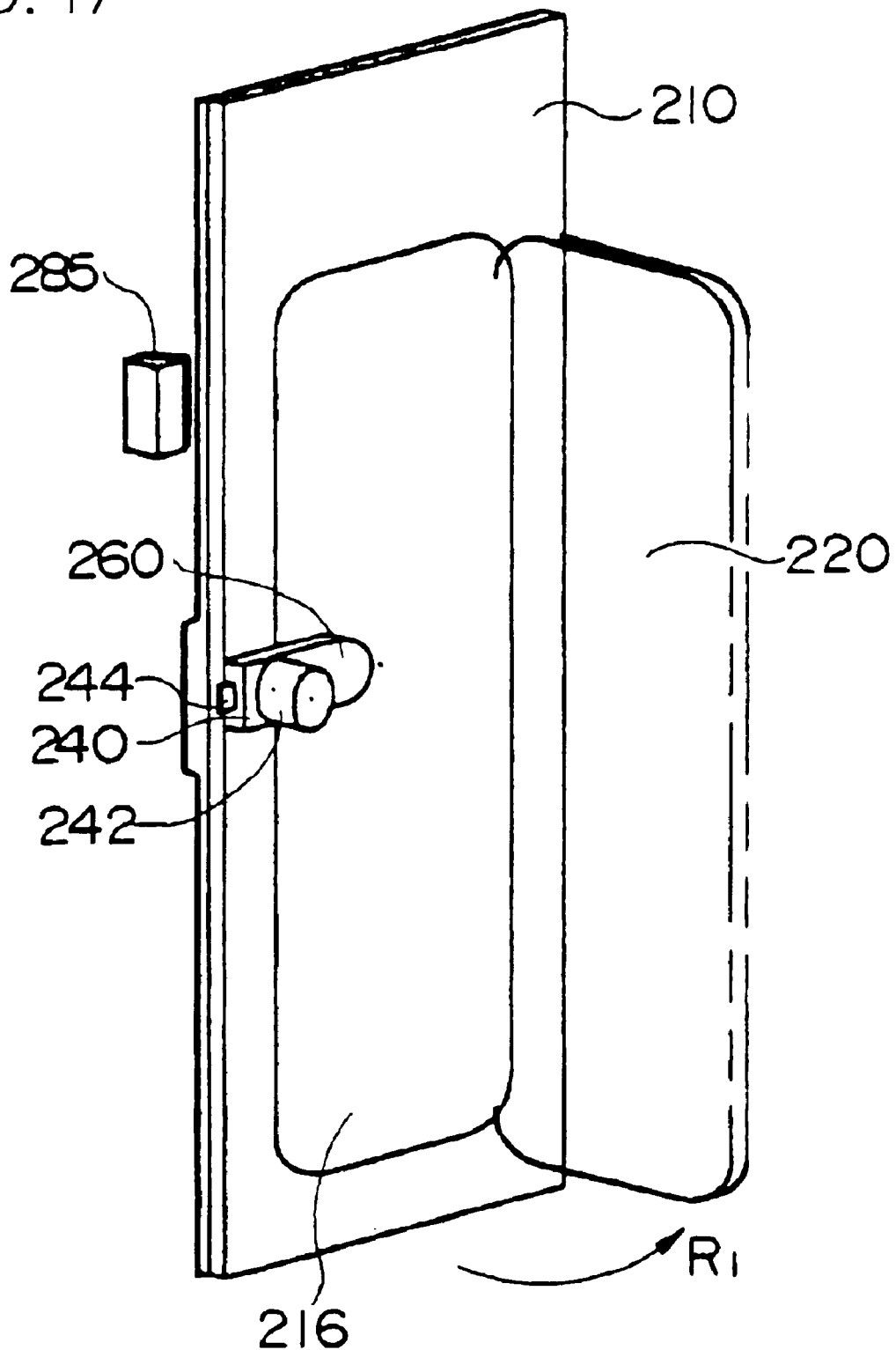
FIG. 17 is an explanatory view showing the operation of the cockpit door according to the third embodiment of the present invention.
Figure 18:
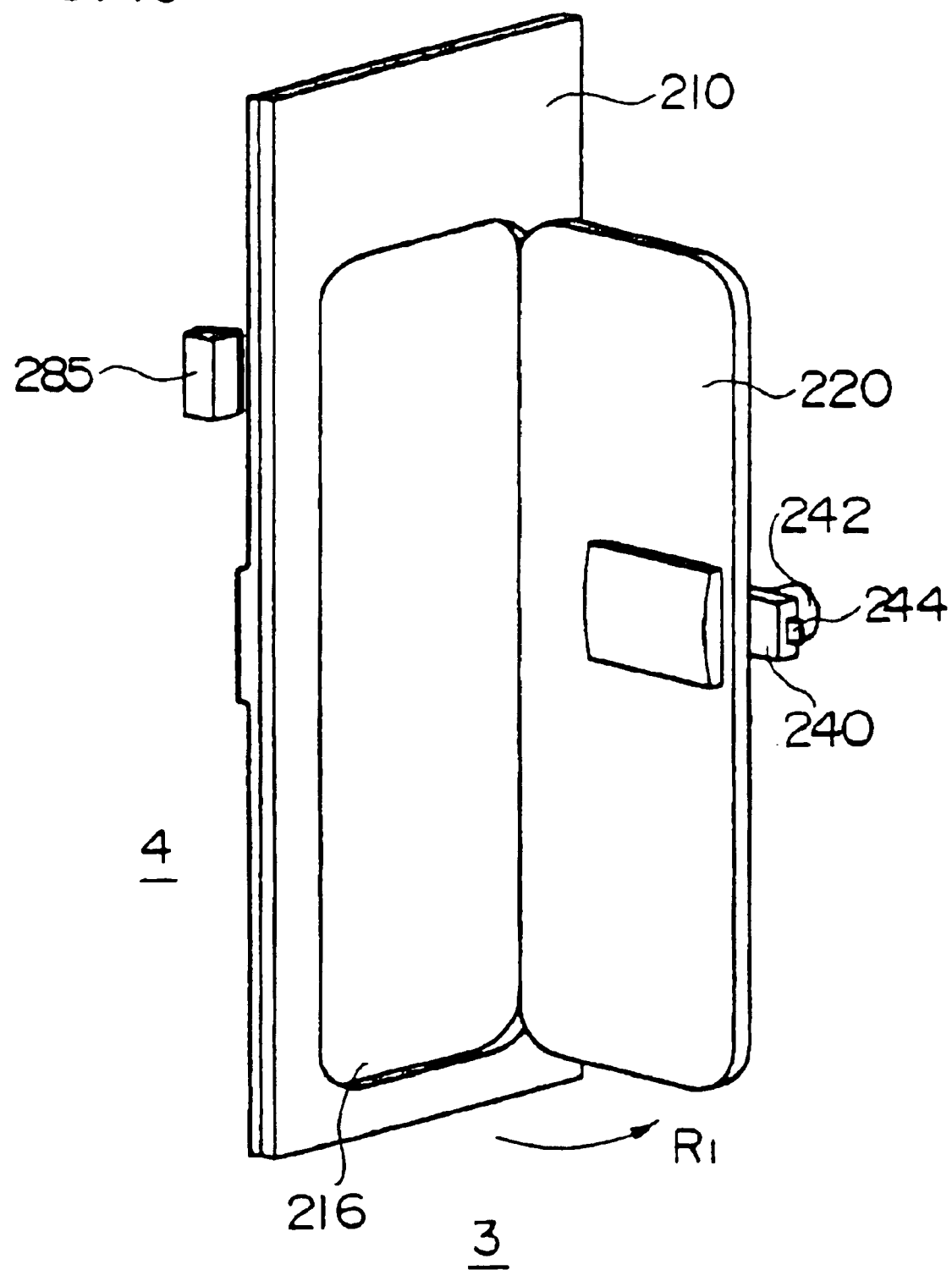
FIG. 18 is an explanatory view showing the operation of the cockpit door according to the third embodiment of the present invention.

FIGS. 13 through 18 illustrate a third embodiment of the present invention, wherein FIG. 13 is an explanatory view of the cockpit door seen from the cockpit side, FIG. 14 is a cross-sectional view of FIG. 13, FIG. 15 is a side view of the cockpit door, FIG. 16 is an explanatory view showing the cockpit door from the cabin side, and FIGS. 17 and 18 are explanatory views showing the operation of the cockpit door.

The cockpit door, the whole of which being designated by reference number 201, comprises a board-like door body 210, and the door body 210 is secured to a fixed structural member via a hinge 220 so that it can be opened toward the cabin.

The side portion of the door body 210 opposite to where the hinge 220 is located is equipped with a first latch device 240 that functions as a main latch for the cockpit door.

The first latch device 240 comprises a knob 242 that can be operated only from the cockpit side, and a bolt 244 that is interlocked with the movement of the knob 242, wherein the bolt 244 is capable of being engaged with or released from a catch 2a provided to the fixed structural member.

The cockpit door opens toward the cabin 4.

A panel member 230 that is smaller than the door body is disposed to the inner side of the door body 210 and supported by a hinge portion 232.

The panel member 230 is equipped with a door scope 270 enabling a crew to visually confirm the status of the cabin from the cockpit side.

The first latch device 240 is equipped with a pressure-sensitive latch device 260 for mechanically detecting the rapid change in pressure within the cockpit and releasing the panel member 230.

FIG. 16 shows the cockpit door seen from the cabin side.

The latch device disposed on the cockpit side of the door is covered with a cover 255.

The present cockpit door is equipped with an electronic lock, and the commands from control circuits 280 and 281 are transmitted via a line 282 to the electronic lock 286. The electronic lock 286 is manipulated through a switch 285 with a cover.

FIG. 17 shows the operation of the panel member when rapid decompression occurs in the cockpit.

The pressure-sensitive latch device 240 releases the panel member 220, and the panel member 220 opens toward the cockpit 3 in the direction shown by arrow $R_1$.

The air within the cabin is communicated into the cockpit through the opening 216, thereby relieving the pressure difference.

FIG. 18 shows a mean for providing an emergency escape route for the crew within the cockpit when the door body 210 fails to open by some reason.

The crew in the cockpit 3 can manipulate the knob 242 on the latch device 240 to open the panel member 220 toward the direction of arrow $R_1$, and escape through the opening 216 into the cabin 4.

What is claimed is:

1. A cockpit door disposed between a passenger cabin and a cockpit of an aircraft, the cockpit door comprising:

a door body that opens toward the passenger cabin via a hinge disposed vertically and a latch disposed on a side end portion opposite to the hinge on the door body;

four flaps that open toward the cockpit via hinges disposed horizontally with respect to the door body, and a latch for locking the flaps; and a pressure sensitive device for detecting a pressure difference between the cabin and the cockpit, and releasing the latch of the flaps wherein the center folding door is defined by the two flaps having a common hinge between their free ends, and wherein the double door structure is defined by hinges being on opposite sides of the two flaps such that the flaps swing between the hinges; wherein the two flags disposed on an upper portion of the door body have a center-folding door structure, and the two flaps disposed on a lower portion of the door body have a double door structure.

2. The cockpit door according to claim 1, wherein the two flaps having the center-folding door structure disposed on the upper portion of the door body can be disengaged from the door body by manipulating from the cockpit side.

* * * * *